United States Patent
Chen et al.

(10) Patent No.: US 10,410,429 B2
(45) Date of Patent: Sep. 10, 2019

(54) METHODS AND APPARATUS FOR THREE-DIMENSIONAL IMAGE RECONSTRUCTION

(71) Applicant: HERE Global B.V., Eindhoven (NL)

(72) Inventors: Xin Chen, Evanston, IL (US); Xinyu Huang, Cary, NC (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/279,876

(22) Filed: May 16, 2014

(65) Prior Publication Data
US 2015/0332110 A1  Nov. 19, 2015

(51) Int. Cl.
| | |
|---|---|
| G06T 19/20 | (2011.01) |
| G06T 15/20 | (2011.01) |
| G06K 9/46 | (2006.01) |
| G06K 9/20 | (2006.01) |

(52) U.S. Cl.
CPC ............ *G06T 19/20* (2013.01); *G06K 9/2081* (2013.01); *G06K 9/4642* (2013.01); *G06T 15/205* (2013.01); *G06K 2209/40* (2013.01); *G06T 2200/24* (2013.01); *G06T 2210/12* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 6,137,491 A * | 10/2000 | Szeliski | ................ | G06K 9/209 345/419 |
| 7,062,416 B1 * | 6/2006 | Arita | ....................... | G06T 19/00 345/419 |
| 8,676,498 B2 | 3/2014 | Ma et al. | | |
| 8,798,357 B2 * | 8/2014 | Sinha | ................. | G06K 9/00664 345/419 |
| 2009/0009513 A1 * | 1/2009 | van den Hengel | ... | G06T 7/0071 345/420 |
| 2009/0244062 A1 * | 10/2009 | Steedly | ................. | G06T 7/0061 345/420 |
| 2010/0284607 A1 * | 11/2010 | Van Den Hengel et al. | ............... | 382/154 |
| 2010/0315412 A1 * | 12/2010 | Sinha | .................... | G06T 7/0065 345/419 |

(Continued)

OTHER PUBLICATIONS

Sinha et al., "Interactive 3D Architectural Modeling from Unordered Photo Collections," Dec. 2008, ACM SIGGRAPH Asia 2008 papers, article 159, pp. 1-5.*

(Continued)

*Primary Examiner* — Andrew G Yang
(74) *Attorney, Agent, or Firm* — Alston & Bird LLP

(57) ABSTRACT

Improved mechanisms for three-dimensional image reconstruction are disclosed. A user is presented with a scene image and allowed to select elements of the image, such as planes, within which features are to be detected. The features are detected and tracked and objects (such as planes) are constructed. The user is allowed to revise the constructed objects and may be allowed to repeat image element selection, with feature detection and tracking and object construction being repeated. When element selection and object construction and user revision are completed, a three-dimensional reconstruction of the scene image is computed.

23 Claims, 3 Drawing Sheets

(56) References Cited

U.S. PATENT DOCUMENTS

| | | | | |
|---|---|---|---|---|
| 2011/0012900 | A1* | 1/2011 | Rotem | G06T 7/32 345/419 |
| 2011/0181589 | A1* | 7/2011 | Quan | G06T 17/05 345/420 |
| 2012/0290976 | A1* | 11/2012 | Lahm | G06F 19/3406 715/810 |
| 2013/0061198 | A1* | 3/2013 | Brier | G06F 3/0481 716/139 |
| 2013/0265387 | A1 | 10/2013 | Jin | 348/42 |
| 2013/0293686 | A1* | 11/2013 | Blow et al. | 348/50 |
| 2014/0132604 | A1* | 5/2014 | Bao et al. | 345/420 |
| 2014/0241576 | A1* | 8/2014 | Yu | G06T 7/55 382/103 |
| 2014/0270484 | A1* | 9/2014 | Chandraker et al. | 382/154 |
| 2014/0285619 | A1* | 9/2014 | Acquavella | G06T 19/20 348/43 |
| 2015/0070352 | A1* | 3/2015 | Jones | G06T 7/0044 345/420 |
| 2015/0161822 | A1* | 6/2015 | Basu | G06T 19/006 345/633 |
| 2015/0170260 | A1* | 6/2015 | Lees | G06Q 30/0643 705/27.2 |

OTHER PUBLICATIONS

Wanner et al., "Simplified User Interface for Architectural Reconstruction," Sep. 2012, Eurographics, pp. 37-40.*

Frahm, J. et al.; "Building Rome on a Cloudless Day"; Computer Vision-ECCV 2010; pp. 368-381.

Lee, G. et al.; "MAV Visual SLAM with Plane Constraint"; IEEE International Conference on Robotics and Automation (ICRA); 2011; pp. 3139-3144.

Lin, H. et al.; "Semantic Decomposition and Reconstruction of Residential Scenes from LiDAR Data"; ACM Transactions on Graphics (Proc. F SIGGRAPH 2013), 32(4); 2013; whole document (10 pages).

Sinha, S. et al.; "Interactive 3D Architectural modeling from Unordered Photo Collections"; ACM Transactions on Graphics (TOG), vol. 27, No. 5, Article 159; Dec. 2008; whole document (10 pages).

Wu, C. et al.; "Multicore Bundle Adjustment"; IEEE Conference on Computer Vision and Pattern Recognition (CVPR); 2011; pp. 3057-3064.

Wu, C. et al.; "Schematic Surface Reconstruction"; IEEE Conference on Computer Vision and Pattern Recognition (CVPR); 2012; pp. 1498-1505.

Xiao, J. et al.; "Reconstructing the World's Museums"; Computer Vision-ECCV; 2012; pp. 668-681.

Kim, K. et al.; "Keyframe-based Modeling and Tracking of Multiple 3D Objects"; IEEE ISMAR; 2010; pp. 193-198.

Rieffel, E. et al.; "Interactive Models from Images of a Static Scene"; CGVR; 2009; pp. 41-47.

Simon, G. et al.; "Markerless Tracking using Planar Structures in the Scene"; IEEE and ACM International Symposium on Augmented Reality (ISAR 2000); 2000; pp. 120-128.

Simon, G.; "In-Situ 3D Sketching Using a Video Camera as an Interaction and Tracking Device"; 31$^{st}$ Annual Conference of the European Association for Computer Graphics—Eurographics; 2010; whole document (4 pages).

Kowalczuk, J. et al.; "Scale-Accurate 3D Vehicle Point Cloud Extraction from Single-Camera Traffic Video"; Proceedings of the 2013 International Conference on Image Processing, Computer Vision, and Pattern Recognition (IPCV 2013); Jul. 22-25, 2013; Las Vegas, Nevada; pp. 626-632.

\* cited by examiner ns and APPARATUS FOR
THREE-DIMENSIONAL IMAGE
RECONSTRUCTION

TECHNICAL FIELD

The present invention relates generally to image processing. More particularly, various embodiments relate to improved systems and techniques for reducing graphics processing load in three-dimensional image reconstruction.

BACKGROUND

Three-dimensional imaging is an increasingly popular feature particularly in modern-day portable electronic devices such as smartphones and tablets. One exemplary technique used for reconstruction is structure from motion (SfM). Structure from motion is a range imaging technique, in which the positions of points are determined within a range of ambiguity defined by the distance from the point to a camera. Other techniques are known, and all techniques that rely on a single camera share the inherent limitation that a camera captures a 2D image. Placement of a point from a 2D image into a 3D model carries a great deal of uncertainty about the position of the point on the 3D model. Generally, prior-art techniques work with a number of images and perform a great deal of processing in order to reduce the uncertainty associated with point placement. Thus, a single image defines a point cloud the analysis of multiple images is needed to resolve a point cloud. As a camera captures images of objects from multiple perspectives (such as during motion of a camera through space in the vicinity of the object and changes in orientation of the camera) large numbers of point clouds may be defined, and resolving these point clouds to define a three-dimensional object can require large amounts of processing that can be difficult to support with the resources provided by a smartphone or tablet which is typically small and has relatively limited processing power as compared to larger data processing devices.

SUMMARY

In one embodiment of the invention an apparatus comprises at least one processor and memory storing a program of instructions. The memory storing the program of instructions is configured to, with the at least one processor, cause the apparatus to at least present an interface to a user allowing a user to specify areas of interest within an image of a scene and, in response to selections by the user, identify selected planes and regions within the planes. Features within the selected planes and regions are detected and tracked across multiple scene image frames. Three-dimensional reconstruction is performed on the tracked features to create one or more three-dimensional models representing the scene.

In another embodiment of the invention, a method comprises presenting an interface to a user allowing a user to specify areas of interest within an image of a scene and, in response to selections by the user, identify selected planes and regions within the planes. Features within the selected planes and regions are detected and tracked across multiple scene image frames. Three-dimensional reconstruction is performed on the tracked features to create one or more three-dimensional models representing the scene.

In another embodiment of the invention, a computer readable medium stores a program of instructions. Execution of the program of instructions by a process configures the apparatus to at least present an interface to a user allowing a user to specify areas of interest within an image of a scene and, in response to selections by the user, identify selected planes and regions within the planes. Features within the selected planes and regions are detected and tracked across multiple scene image frames. Three-dimensional reconstruction is performed on the tracked features to create one or more three-dimensional models representing the scene.

DETAILED DESCRIPTION

Embodiments of the present invention address problems such as the computational load presented by 3D reconstruction, and the difficulty of supporting this load with the processing power provided by mobile devices. Attempting to reduce the scope of the problem through user selection has generally presented difficulties in part due to small screen size and the fact that user interaction tends to be imprecise. The instrument by which a user generally interacts with a smartphone or tablet is the user's finger on the touchscreen, and the size of the finger makes it an imprecise instrument for selecting a point on an image.

3D reconstruction is generally accomplished by construction and placement of 2-dimensional objects. 2D objects, such as planar surfaces, are constructed, and these objects are oriented and stitched together so as to form a 3-dimensional model of the scene. A camera captures a scene as a collection of points, and the mere presentation of the points as they are captured is sufficient to allow a human observer to recognize the patterns presented by the collection of points and see the scene as a whole. In addition, a human observer is able to recognize which elements of the image are and are not elements of significant portions of a pattern and, thus, important to understanding of the image. The most advanced data processing devices provide (if anything) nothing more than a rudimentary approach to such capabilities, and certainly small portable processing devices have limited or no pattern recognition capabilities. Instead, as noted above, most conventional 3D reconstruction comprises processing of points over multiple images.

One or more embodiments of the invention therefore provide opportunities for a human user to identify relevant elements of an image, to view the appropriate stages of the image undergoing 3D reconstruction, and to refine elements of the image.

One or more exemplary techniques of 3D reconstruction construct and combine planar elements, with the construction being based on computations carried out through tracking of identified image features through a plurality of image frames showing different (such as successive) views and perspectives of the image. In order to simplify the identification of features, and reduction of the number of features that need to be tracked and processed, embodiments of the present invention provide mechanisms for allowing a simple user interaction to reduce the number of features that need to be computed and tracked, and selecting planes to which features are to be fitted. Features of an image may be defined in terms of scale-invariant feature transform (SIFT) feature points. Each feature of an image, such as an edge, corner, or color change has a (generally large) number of associated feature points.

Figure 1:
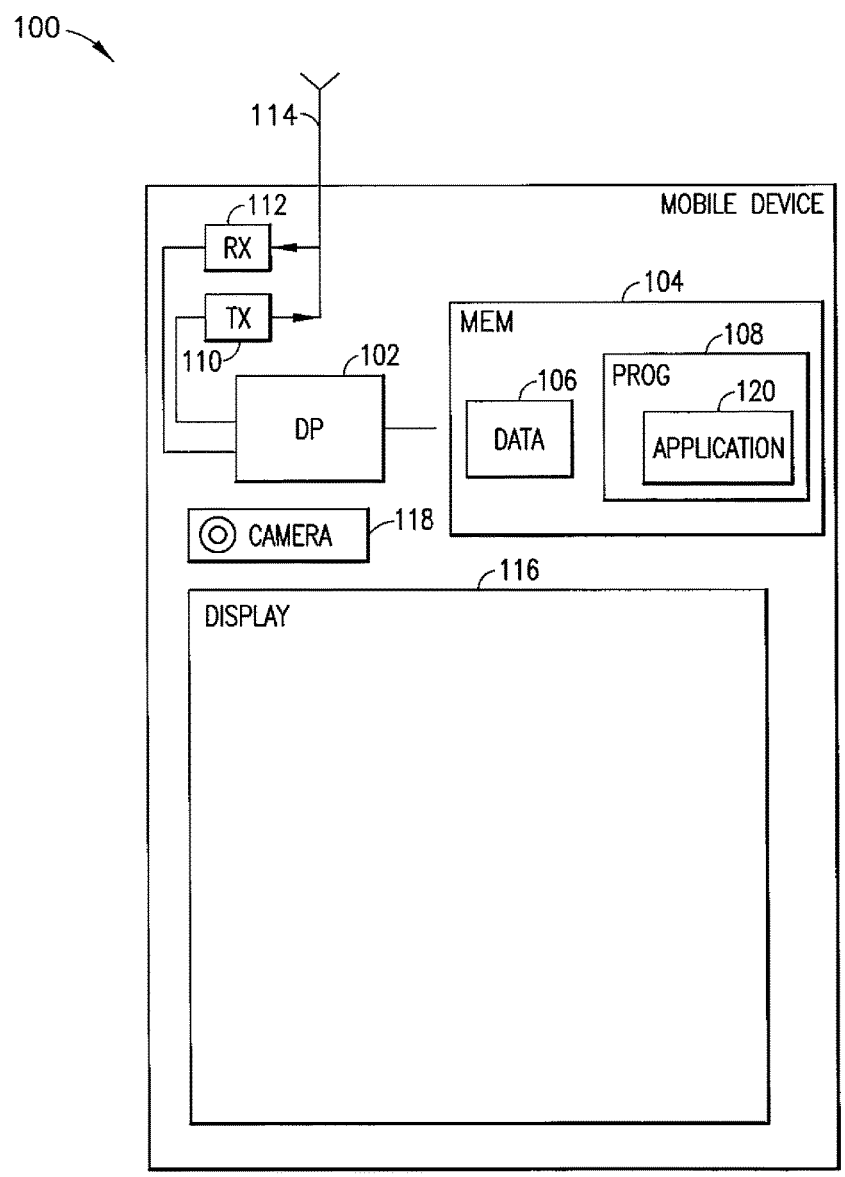
FIG. 1 illustrates a mobile device according to an embodiment of the present invention.

FIG. 1 illustrates a mobile device 100 according to one or more embodiments of the present invention. The mobile device 100 includes processing means such as at least one data processor (DP) 102, storage such as at least one computer-readable memory (MEM) 104 storing data 106 and at least one computer program (PROG) 108 or other set of executable instructions, communicating means such as a transmitter TX 110 and a receiver RX 112 for bidirectional wireless communications (such as with a networking access point or a cellular base station) via one or more antennas 114. The mobile device 100 further comprises a display 116 and a camera 118. The display 116 may be a touch screen interface and the display 116 may allow a user to view images captured using the camera 118 and to make selections in the image, as discussed in greater detail below. The camera 118 may be set to capture an image or sequence of images, and 2-dimensional features appearing in images may be detected and tracked (for example, as a user moves the camera through a space or to different perspectives. The image or image sequence is presented on the display 116 after capture, or as the camera moves, and a user is able to make selections using the touch screen interface. The user selections may specify features to be processed, greatly reducing processing load as compared to processing an entire scene image.

According to one or more embodiments of the invention, a user may open an image processing and 3D reconstruction application 120 (which may be one of the PROGS 108. The application 120 may control the camera 118 to display images and the application 120 may identify and track features through successive image frames as the camera 118 moves and changes orientations so as to bring different regions of the scene and to change the perspective with which the scene or regions of the scene are viewed.

In one or more embodiments of the invention, the application 120 sets bounds on, and otherwise identifies, regions to be tracked and processed for 3D reconstruction. When the user invokes the application 120, the user may be presented with an opportunity to designate a selection mechanism, and the designation may be used to interpret user interactions to specify the selection indicated by the interaction. For example, the application 120 may present a menu of categories into which selections may fall, for example, a single plane, parallel planes, perpendicular planes, and coplanar planes. The menu may remain available throughout operation of the application 120, allowing a user to control the interpretation of selections throughout the reconstruction process.

Once the user has made a selection from the menu, for example, the user may make touches to the display 116, and these touches are interpreted so as to designate planes (in one or more exemplary embodiments) and to bound areas within which features are to be detected. It will be recognized that the discussion of touches to the display 116 is exemplary only, and that numerous other techniques may be used. For example, in some embodiments, the user may be able to designate planes using other input techniques, for example, using keypads, keyboards, touchpads, and the like. Features may be, for example, SIFT, Harris Corners, line segments, and other specified features commonly used in 3D reconstruction. Features may also be a mix of points and line segments.

Once the plane and feature selection has been made, features may be tracked across image frames. Plane and feature selections may be made and changed before, during or after scene image capture and tracking may be performed during or after scene image capture, depending on design choices and user selections. Image frames (which may be key image frames) may be searched, with the search being able to extend to frames captured before the user selections. The detected point and/or line features may be tracked across image frames, so as to establish correspondences between image frames around the time of user selections.

Tracking may be accomplished by any number of mechanisms, such as Kanade-Lucas-Tomasi (KLT) feature tracking, Kalman filtering, simple brute force matching across all pairs of features in designated image frame pairs, and any other suitable mechanisms. Tracking may also use information from sensors such as an accelerometer 124. The use of such information provides for estimation of relative translation and rotation between image frames.

Once tracking of features has been accomplished, 3D reconstruction may be applied based on features that correspond across image frames. Bundle adjustment may be performed to estimate parameters such as camera parameters and sparse 3D points. Fusion (such as Kalman filtering) of results from structure from motion (if structure from motion is used) and sensing systems can also be performed to improve estimation accuracy. The 3D reconstruction may be performed using structure from motion or other 3D reconstruction techniques. If structure from motion is used, plane information may be integrated into the local bundle adjustment used by structure from motion. Structure from motion uses a Jacobian matrix during the bundle adjustment, and this matrix may include a set of sub-matrices with respect to the plane parameters. The plane parameters may also be related based on relationships specified by the user.

In an initial stage of 3D reconstruction, a set of 3D planes (defined by plane parameters) is available. These 3D planes can be viewed in a 3D space (presented, for example, using the display 116). The application 120 defines the boundaries of the planes in order to generate a 3D model. Boundaries may be generated based on the detected features, with the boundaries being the bounding boxes of the detected features.

After the initial stage is completed, further user interaction may be performed to refine the 3D modeling. Further user menus or interaction mechanisms may be provided, allowing a user to further refine bounding boxes. The bounding boxes may suitably be presented as 2D bounding boxes. For example, a user can touch the display one or multiple times. The center point of each touched region may be projected back to the 3D space to form a 3D line, and 3D planes may be constructed or oriented to intersect with the 3D lines. The 3D planes or bounding boxes appearing nearest the viewer of the image may be highlighted and these planes or bounding boxes may be selected for further operations, such as merging, deletion, resizing, and so on. For example, to merge two planes, the user may touch the screen twice to select two 3D planes. The second selected plane may be translated or rotated so that the two planes are coplanar. To take another example, the user may touch one or more corners of a bounding box and increase or decrease the size of the bounding box. Such an approach can be used to cover most parts of a 3D space, with portions of the space, particularly no-planar objects, being excluded from presentation to and interaction by the user. Other user actions are deletion (as noted above) and construction of shapes—for example, a user may generate a rectangular solid by selecting three bounding boxes. Different or additional geometric shames may be selected other than planes. For example, a user may be allowed to select a set of feature points by swiping fingers across the screen. The feature points in the swiped areas may be searched across image frames, which may be fitted into different 2D and 3D shapes after 3D reconstructions. The 2D shapes may be used to define circular and elliptical boundaries.

In addition, the user may be provided with the opportunity to return to region selection and make additional selections, with plane and bounding box construction being repeated based on the new selections, and the user being given additional opportunities to adjust the objects.

Figure 2:
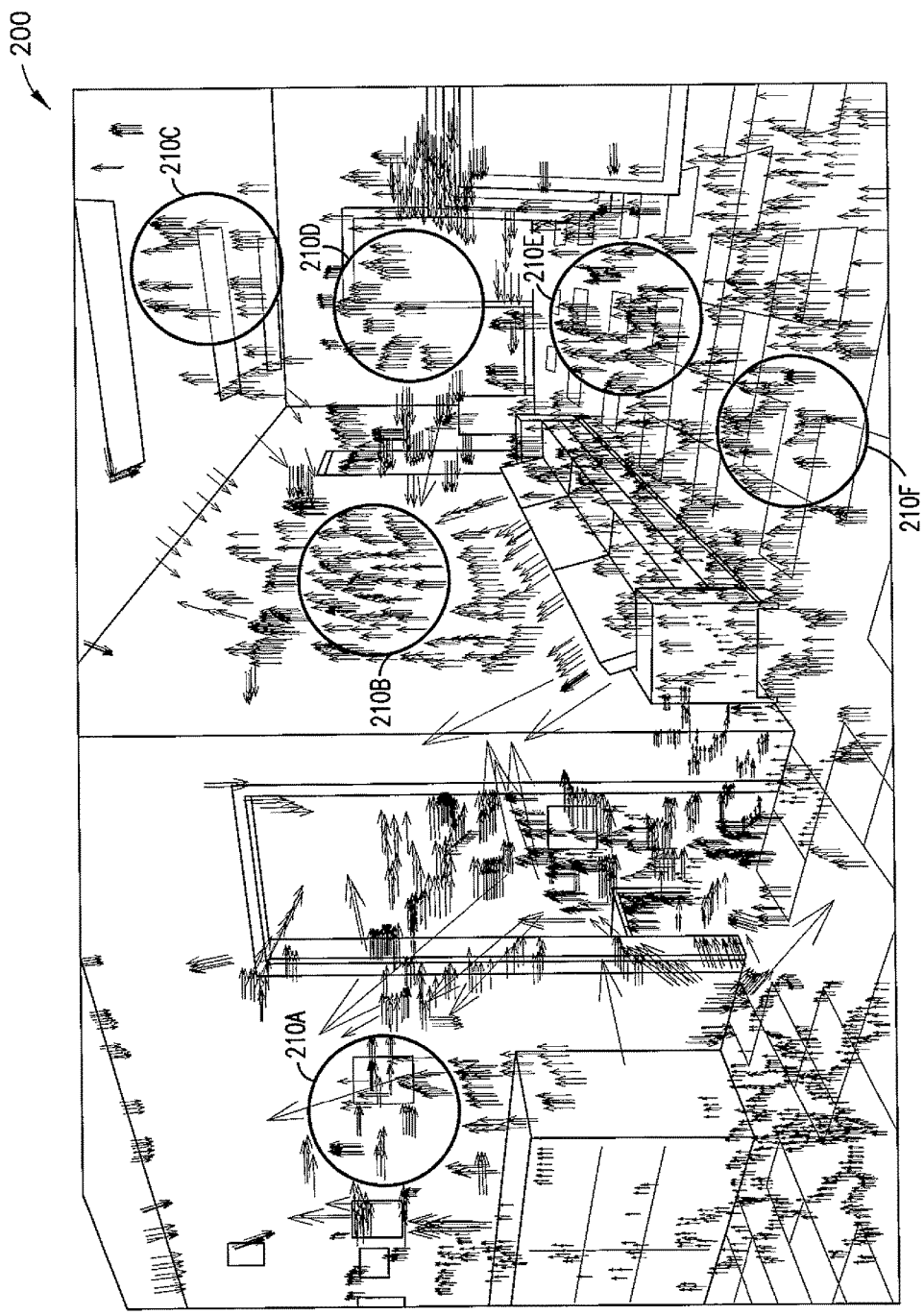
FIG. 2 illustrates a scene view undergoing processing according to an embodiment of the present invention.

FIG. 2 illustrates a scene image 200 comprising a number of features such as corners, edges, or color changes between adjacent portions of the image (such as the black and white squares. Each feature in the image 200 has a large number of associated feature points, represented by arrows, with an arrow representing a feature point. As can be seen, the features appearing in the scene image 200 have a very large number of associated arrows. Embodiments of the present invention allow a user to select a restricted number of feature points to be used in performing a 3D reconstruction. The scene 200 illustrates user selections, represented by circles 210A-210F, with each selection of each circle specifying a plane and also designating a relatively small number of feature points appearing on the specified plane and encompassed by the circle. The circle 210A, for example, specifies an area of the back left wall on which a picture has been placed, the circle 210B specifies an area of the more rightward perpendicular wall on which a chart has been placed, the circle 210C specifies an area of the ceiling on which light fixtures have bee placed, the circle 210D specifies the a portion of the back wall intersected by a door, the circle 210E specifies a portion of the floor pattern, and the circle 210F specifies a different portion of the floor pattern intersected by a chair mat. A user may see these areas as having particularly notable features that may be easily tracked and that define the contours of the scene. Selection of different portions of the image might result in repeated selection of the same plane.

Once a user has made the selections, the feature points encompassed by the selected area may then be tracked, with fitted bounding boxes being displayed to the user, as noted above.

Figure 3:
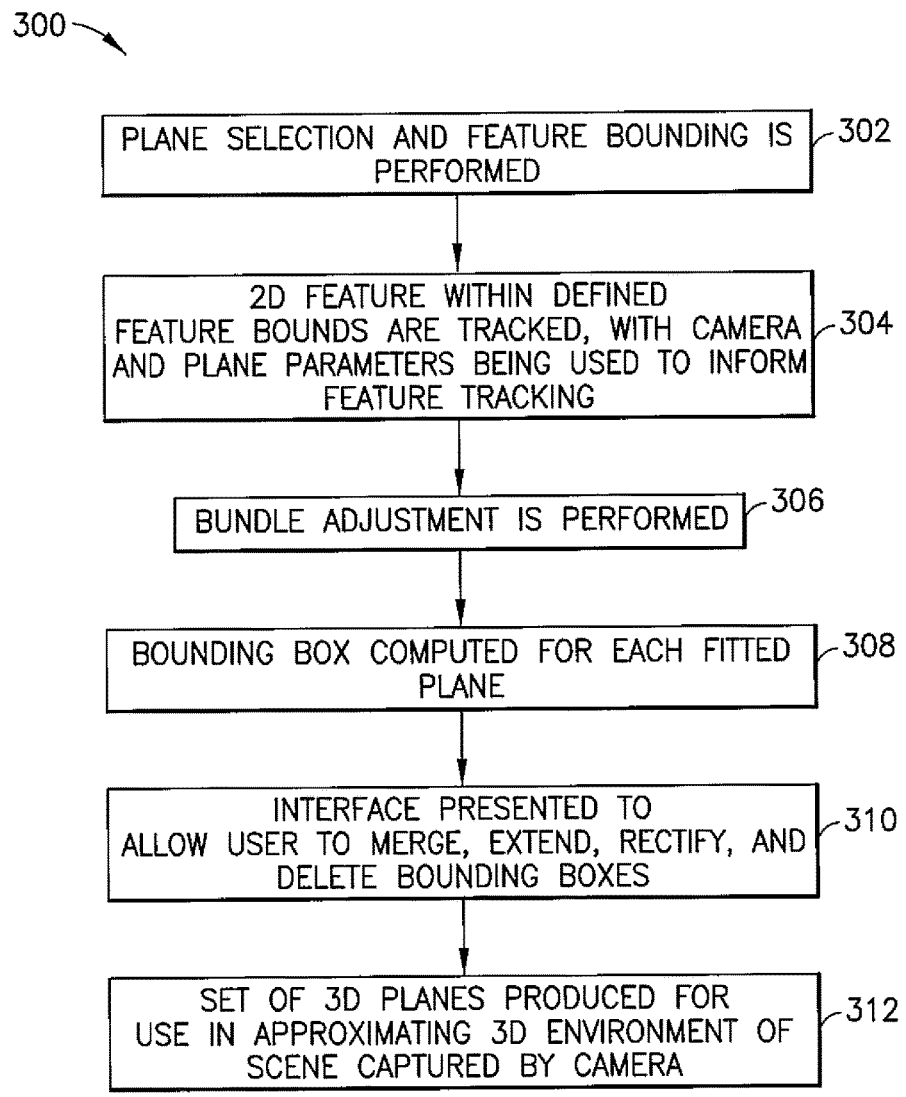
FIG. 3 illustrates a process according to an embodiment of the present invention.

FIG. 3 illustrates a process 300 according to an embodiment of the present invention. At block 302, for each area of interest, plane selection and feature bounding is performed, such as by touching a display screen presenting a scene image captured by a camera. At block 304, 2D features within the defined feature bounds are tracked, with camera and plane parameters being used to inform the feature tracking. At block 306, bundle adjustment is performed, and the plane constraints may be integrated into local bundle adjustment. The bundle parameters may be in the form of one or more Jacobian matrices, with the matrices being of the form:

$$J = \begin{pmatrix} J_c & J_x & 0 \\ 0 & J_{x_n} & J_n \end{pmatrix}.$$

$J_c$ and $J_x$ are Jacobians with respect to camera parameters and 3D map points, and $J_n$ are Jacobians with respect to the 3D map points and plane parameters. It will be noted that it is possible to bundle only the camera parameters, in order to further reduce complexity. At block 308, a bounding box is computed for each fitted plane. At block 310, an interface is presented to a user to allow the user to merge, extend, rectify, and delete bounding boxes. The user may be allowed to delete and revise parameters and to gather new images and perform further use interactions until satisfied. At block 312, a set of 3D planes are produced that are used to approximate the 3D environment of the scene image captured by the camera.

Returning now to FIG. 1, at least one of the PROGs 108 in the mobile device 100 is assumed to include a set of program instructions that, when executed by the associated DP 102, enable the device to operate in accordance with the exemplary embodiments of this invention, as detailed above. In these regards the exemplary embodiments of this invention may be implemented at least in part by computer software stored on the MEM 104, which is executable by the DP 102 of the mobile device 100, or by hardware, or by a combination of tangibly stored software and hardware (and tangibly stored firmware). An electronic devices implementing these aspects of the invention need not be the entire devices as depicted at FIG. 1 or may be one or more components of same such as the above described tangibly stored software, hardware, firmware and DP, or a system on a chip SOC or an application specific integrated circuit ASIC.

In general, the various embodiments of the mobile device can include, but are not limited to personal portable digital devices having wireless communication capabilities, including but not limited to cellular telephones, navigation devices, laptop/palmtop/tablet computers, digital cameras and music devices, and Internet appliances.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor; and
   memory storing a program of instructions,
   wherein the memory storing the program of instructions is configured to, with the at least one processor, cause the apparatus to at least:
   present an interface to a user including a menu of categories allowing the user to select areas of interest within an image of a scene and a category from the menu, wherein the areas of interest comprise planes of surfaces within the scene, and wherein the categories include at least one of: a single plane, parallel planes, perpendicular planes, or coplanar planes;
   in response to selection by the user:
   identify selected planes of the scene and regions within the planes and categorize the selected planes according to a selected category;
   detect features within the selected planes and regions, wherein detected features comprise one or more of scale invariant feature transform feature points, line segments, or Harris corners;

form one or more bounding boxes encompassing groups of detected features;

perform bundle adjustment on the detected features encompassed by the one or more bounding boxes, wherein bundle adjustment comprises integrating plane constraints for local bundle adjustment;

automatically track the detected features across multiple successive scene image frames, wherein a user does not need to select the detected features within the multiple scene image frames; and perform three-dimensional reconstruction on the tracked features to create one or more three-dimensional models representing the scene.

2. The apparatus of claim 1, wherein the three-dimensional reconstruction comprises at least a first intermediate stage in which one or more preliminary models are created, and wherein the apparatus is further caused to:

present the one or more of preliminary models to the user;

present an interface to the user allowing the user to provide inputs to adjust the one or more parameters of the preliminary models; and refine the one or more preliminary models based on the inputs from the user.

3. The apparatus of claim 2, wherein the one or more of preliminary models comprises three-dimensional planes, bounding boxes, or both and wherein one or more three-dimensional planes is selected for adjustment in response to a user designation.

4. The apparatus of claim 2, wherein adjustment of parameters comprises one or more of merging, deletion, or resizing of three-dimensional planes, bounding boxes, or both.

5. The apparatus of claim 4, wherein merging of planes comprises selection of two or more planes for merging, and orientation of at least one of the planes to position the at least one of the planes for merging.

6. The apparatus of claim 2, wherein, the apparatus is further caused to, after adjustment of parameters of the preliminary models, provide the user with opportunities for further selection of planes and regions for feature detection and tracking and, after the further selection, detect and track features within the newly selected planes and regions and perform three-dimensional reconstruction on the newly tracked features.

7. The method apparatus of claim 1, wherein the menu of categories comprises two or more of: single plane, parallel planes, perpendicular planes, or coplanar planes.

8. The apparatus of claim 1, wherein bundle parameters of the bundle adjustment are in the form of one or more Jacobian matrices.

9. The apparatus of claim 8, wherein the one or more Jacobian matrices comprises a matrix of the form:

$$J = \begin{pmatrix} J_c & J_x & 0 \\ 0 & J_{x_n} & J_n \end{pmatrix}.$$

where $J_c$ and $J_x$ are Jacobians with respect to camera parameters and three-dimensional map points, and $J_{x_n}$ and $J_n$ are Jacobians with respect to the three dimensional map points and plane parameters.

10. The apparatus of claim 1, wherein the apparatus is further caused to at least one of merge, extend, rectify, or delete one or more bounding boxes in response to input from a user.

11. A method comprising:

presenting an interface to a user including a menu of categories allowing a user to specify areas of interest within an image of a scene and a category from the menu, wherein the areas of interest comprise planes of surfaces within the scene, and wherein the categories include at least one of: a single plane, parallel planes, perpendicular planes, or coplanar planes;

in response to selection by a user:

identifying selected planes of the scene and regions within the planes and categorizing the selected planes according to a selected category;

detecting features within the selected planes and regions, wherein detected features comprise one or more of scale invariant feature transform feature points, line segments, or Harris corners;

forming one or more bounding boxes encompassing groups of detected features;

performing bundle adjustment on the detected features encompassed by the one or more bounding boxes, wherein bundle adjustment comprises integrating plane constraints for local bundle adjustment;

automatically tracking the detected features across a scene image frame and a subsequent scene image frame, wherein a user does not need to select the detected features within the multiple scene image frames; and performing three-dimensional reconstruction on the tracked features to create one or more three-dimensional models representing the scene.

12. The method of claim 11, wherein the three-dimensional reconstruction comprises at least a first intermediate stage in which one or more preliminary models are created, and wherein the method further comprises:

presenting one or more of the preliminary models to the user;

presenting an interface to the user allowing the user to provide inputs to adjust the adjusting one or more parameters of the preliminary models; and refining the one or more preliminary models based on the inputs from the user.

13. The method of claim 12, wherein one or more of the preliminary models comprise three-dimensional planes, bounding boxes, or both and wherein one or more three-dimensional planes is selected for adjustment in response to a user designation.

14. The method of claim 12, wherein adjustment of parameters comprises one or more of merging, deletion, or resizing of three-dimensional planes, bounding boxes, or both.

15. The method of claim 14, wherein merging of planes comprises selection of two or more planes for merging, and orientation of at least one of the planes to position the at least one of the planes for merging.

16. The method of claim 12, wherein, the method further comprises, after adjustment of parameters of the preliminary models, providing the user with opportunities for further selection of planes and regions for feature detection and tracking and, after the further selection, detecting and tracking features within the newly selected planes and regions and perform three-dimensional reconstruction on the newly tracked features.

17. A non-transitory computer readable medium storing a program of instructions, execution of which by a processor configures an apparatus to at least:

present an interface to a user including a menu of categories allowing a user to specify areas of interest within an image of a scene and a category from the menu, wherein the areas of interest comprise planes of surfaces within the scene, and wherein the categories include at least one of: a single plane, parallel planes, perpendicular planes, or coplanar planes;

in response to selections by a user:
identify selected planes of the scene and regions within the planes and categorize the selected planes according to a selected category;
detect features within the selected planes and regions, wherein detected features comprise one or more of scale invariant feature transform feature points, line segments, or Harris corners;
form one or more bounding boxes encompassing groups of detected features;
perform bundle adjustment on the detected features encompassed by the one or more bounding boxes, wherein bundle adjustment comprises integrating the plane constraints for local bundle adjustment;
automatically track the detected features across multiple scene image frames, wherein the multiple scene image frames are selected from a plurality of successive scene image frames, wherein a user does not need to select the detected features within the multiple scene image frames; and
perform three-dimensional reconstruction on the tracked features to create one or more three-dimensional models representing the scene.

18. The non-transitory computer readable medium of claim 17, wherein the three-dimensional reconstruction comprises at least a first intermediate stage in which one or more preliminary models are created, and wherein the apparatus is further caused to:
present one or more of the preliminary models to the user;
present an interface to the user allowing the user to provide inputs to adjust the adjust one or more parameters of the preliminary models; and
refine the one or more preliminary models based on the inputs from the user.

19. The non-transitory computer readable medium of claim 18, wherein one or more of the preliminary models comprise three-dimensional planes, bounding boxes, or both and wherein one or more three-dimensional planes is selected for adjustment in response to a user designation.

20. The non-transitory computer readable medium of claim 18, wherein adjustment of parameters comprises one or more of merging, deletion, or resizing of three-dimensional planes, bounding boxes, or both.

21. The non-transitory computer readable medium of claim 20, wherein merging of planes comprises selection of two or more planes for merging, and orientation of at least one of the planes to position the at least one of the planes for merging.

22. A handheld mobile device, comprising:
at least one processor; and
memory storing a program of instructions;
wherein the memory storing the program of instructions is configured to, with the at least one processor, cause the apparatus to at least:
present an interface to a user including a menu of categories allowing a user to select areas of interest captured by a camera onboard the handheld mobile device and a category from the menu, wherein the areas of interest comprise planes of surfaces within the scene and detected features comprising one or more of scale invariant transform feature points, line segments, or Harris corners, wherein the selected regions of interest are categorized according to a selected category, and wherein the categories include at least one of: a single plane, parallel planes, perpendicular planes, or coplanar planes;
in response to selection by the user:
form one or more bounding boxes encompassing groups of detected features;
perform bundle adjustment on the detected features encompassed by the one or more bounding boxes, wherein bundle adjustment comprises integrating the plane constraints for local bundle adjustment;
automatically track the areas of interest through multiple frames captured successively by the camera, wherein a user does not need to select the areas of interest within the successive frames captured by the camera;
perform three-dimensional reconstruction on the detected features to create a three-dimensional model of the scene; and
cause the three-dimensional model to be presented on a display of the camera.

23. The handheld mobile device of claim 22, wherein the three-dimensional model comprises a set of three-dimensional planes, and wherein performing the three-dimensional reconstruction comprises fitting the tracked features by a set of three-dimensional planes.

* * * * *